Figure 1:
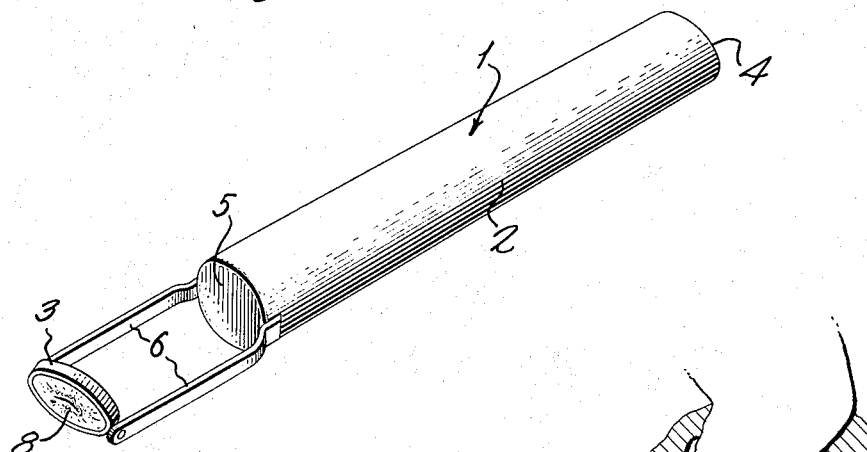

May 22, 1956     W. T. LADY ET AL     2,746,450

BODY CAVITY EXAMINING INSTRUMENT

Filed Oct. 27, 1954

INVENTORS
Thomas M. Leonard and
William T. Lady
BY
Mason, Fenwick & Lawrence
ATTORNEYS

United States Patent Office 2,746,450
Patented May 22, 1956

2,746,450
BODY CAVITY EXAMINING INSTRUMENT

William T. Lady and Thomas M. Leonard, Washington, D. C.

Application October 27, 1954, Serial No. 464,919

2 Claims. (Cl. 128—6)

This invention relates to instruments for use in examining body cavities, and more particularly to instruments which may be used by women in making self-examinations of the cervix.

It has been found that more fatalities in women result from cancer of the cervix than from cancer in any other area. This results from the fact that the cervix is obscured from the woman's view by the collapsed vaginal wall. All too frequently, physicians, in the course of routine pelvic examinations, encounter gross pathological lesions of the cervix which have existed for some time entirely without the patient's knowledge. If it were possible for a woman to make monthly examination's of her own cervix, abnormalities could be discovered and reported to physicians earlier. Early discovery and treatment can result in many instances in preventing fatalities.

The principal object of the present invention is to provide an instrument which can be used by a woman to make periodic self-examination of her cervix to discover any change of condition or appearance, so that if any disorder appears it may be treated immediately.

A more specific object is the provision of an instrument which may be inserted in the vaginal cavity and reflect an image of the cervix which will be visible to the person using the device.

A further object is to provide an instrument of this type which will gather light from outside sources to illuminate the cervix so that a self-contained or attached light source is unnecessary.

Yet another object is to provide such an instrument having no corners or crevises to injure tender membranes or which would make it difficult to keep the instrument sterile.

Other objects of the invention will become apparent from the following description of one practical embodiment thereof, when taken in conjunction with the drawings which accompany, and form part of, this specification.

Figure 2:
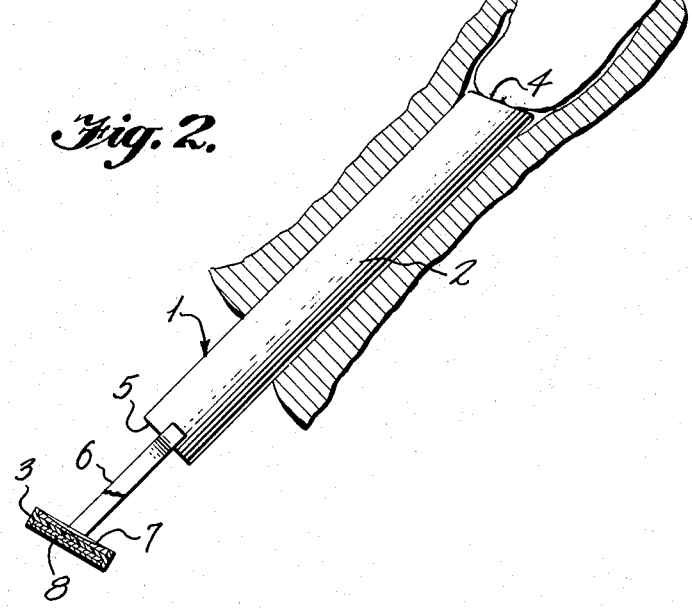

In the drawings:

Figure 1 is a perspective view of an instrument embodying the principles of the present invention; and Figure 2 is a side elevation of the instrument, with parts shown in section, diagrammatically illustrating its position relative to the cervix when in use.

In general, the instrument includes a light-transmitting rod for insertion into the body cavity for end-surface contact with the cervix, and a mirror carried at the back end in which the image of the cervix may be viewed.

Referring to the drawings in detail, there is shown an examining instrument 1, comprising a rod 2 and a combination mirror and comparison picture holder 3 supported from the rod.

The rod 2 is formed of a solid, cylindrical length of clear Lucite, or other similar material capable of picking up external light and directing it along the axis of the rod. The use of a solid rod of such material has many advantages. It will be easy to clean, will transmit a good light on the cervix without an attached illuminating device, and will prevent the user from administering self-treatment or medication through the instrument. The rod has its leading end 4 inclined at an angle of approximately 25° so that its surface will be parallel to the cervix when the rod is inserted into the vagina. The edge is slightly rounded to prevent injury to the vagina mucous membrane. The opposite end 5 is normal to the axis of the rod. All surfaces are highly polished.

The holder 3 is attached to the rod by means of arms 6 which have their ends connected to the rod adjacent the end 5 on diametrically opposite sides of the rod. The arms project rearwardly and may be bent to increase the distance between them, so that they will be outside the projected circumference of the rod and to permit the use of a larger mirror. The outer ends of the arms are pivotally connected to the holder 3.

Holder 3 is in the form of a plastic rim which holds the mirror 7 and a comparison picture 8. The mirror and picture are mounted back-to-back and are visible from opposite sides of the holder. Mirror 7 is slightly concave to provide a somewhat enlarged image of the cervix. The picture 8 is in color, and shows a normal cervix substantially to the same scale as the image which will be seen on the mirror.

In using the instrument, a woman will assume the lithotomy position with legs widely separated to relax the perineal muscles so that the instrument may be introduced easily. A clear surgical lubricating jelly may be used on the surface of the rod. The rod is inserted into the vagina until the leading end 4 is in contact with the cervix. The cervix may be inclined in either direction, depending upon the inclination of the uterus, and the rod may be rotated on its axis so that the inclined surface of the rod end will be flush with the cervix. Any source of light, such as a flashlight, light bulb, etc., will suffice for illumination. The light is directed so that the rays will fall on the outside surface of the rod on that portion which projects outside the vagina. The cervix can then be seen by adjusting the angular position of the mirror. The patient can compare the image seen with the picture on the back of the mirror, and any departure from normal can be reported to the physician as soon as observed. Thus periodic use of the instrument, abnormalities may be detected at an early stage and treatment obtained.

Due to the design and material of the instrument, it may be quickly cleaned with soap and water or a mild antiseptic.

Although the invention has been described, and probably will have its principal use as an instrument for making self-examination of the cervix, it will be apparent that it will have utility in making examinations of other body cavities as well.

While in the above one practical embodiment of the invention has been disclosed, it will be understood that the structure described and shown is merely by way of example and the invention may take other forms within the scope of the appended claims.

What is claimed is:

1. An instrument for making examinations within a body cavity comprising a cylindrical rod of material capable of picking up light rays on its surface and transmitting the rays axially of the rod, and a pivotally mounted mirror carried by the rod spaced from one end thereof.

2. In an instrument for making examinations within a body cavity as claimed in claim 1, said mirror having its pivotal axis intersecting the projected axis of the rod.

References Cited in the file of this patent
UNITED STATES PATENTS

| | | |
|---|---|---|
| 1,542,183 | Steinberg | June 16, 1925 |
| 2,297,799 | Pifer | Oct. 6, 1942 |
| 2,507,935 | Richmond | May 16, 1950 |